US012082152B2

(12) United States Patent
Gonzalez et al.

(10) Patent No.: US 12,082,152 B2
(45) Date of Patent: *Sep. 3, 2024

(54) PAGING OCCASION DESIGN IN NEW RADIO

(71) Applicant: PANASONIC INTELLECTUAL PROPERTY CORPORATION OF AMERICA, Torrance, CA (US)

(72) Inventors: David Gonzalez, Langen (DE); Ming-Hung Tao, Langen (DE); Quan Kuang, Frankfurt (DE); Ankit Bhamri, Langen (DE); Lilei Wang, Beijing (CN); Hidetoshi Suzuki, Kanagawa (JP); Rikin Shah, Langen (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/351,373

(22) Filed: Jul. 12, 2023

(65) Prior Publication Data

US 2023/0371003 A1 Nov. 16, 2023

Related U.S. Application Data

(63) Continuation of application No. 17/731,091, filed on Apr. 27, 2022, now Pat. No. 11,751,167, which is a
(Continued)

(51) Int. Cl.
*H04W 68/02* (2009.01)
(52) U.S. Cl.
CPC .................. *H04W 68/02* (2013.01)

(58) Field of Classification Search
CPC ...................................... H04W 68/02
(Continued)

(56) References Cited

U.S. PATENT DOCUMENTS

2015/0341978 A1  11/2015  Rune
2016/0105869 A1   4/2016  Namboodiri et al.
(Continued)

FOREIGN PATENT DOCUMENTS

CN   101541080 A   9/2009
CN   106961729 A   7/2017
(Continued)

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 15)," 3GPP TS 36.331 V15.1.0, Mar. 2018, 786 pages.
(Continued)

*Primary Examiner* — Joel Ajayi
(74) *Attorney, Agent, or Firm* — Seed IP Law Group LLP

(57) ABSTRACT

The present disclosure relates to a user device, a base station, and data transmission and reception methods to be performed by a user device and a base station in a communications system. The user device comprises circuitry which, in operation, receives paging occasion configuration from the base station, including at least one parameter for configuring a predefined time-domain pattern for receiving paging occasion within a paging cycle; and performs reception of paging signal in the paging occasions within the predefined time-domain pattern configured according to the received paging occasion configuration.

10 Claims, 9 Drawing Sheets

Related U.S. Application Data continuation of application No. 16/981,997, filed as application No. PCT/CN2018/082061 on Apr. 5, 2018, now Pat. No. 11,356,976.

(58) Field of Classification Search
USPC ........................................................ 455/458
See application file for complete search history.

(56) References Cited

U.S. PATENT DOCUMENTS

| | | |
|---|---|---|
| 2016/0135141 A1 | 5/2016 | Burbidge et al. |
| 2017/0013391 A1 | 1/2017 | Rico Alvarino et al. |
| 2018/0092062 A1 | 3/2018 | Chen |
| 2021/0022108 A1 | 1/2021 | Li et al. |

FOREIGN PATENT DOCUMENTS

| | | |
|---|---|---|
| CN | 107258105 A | 10/2017 |
| EP | 2427028 A1 | 3/2012 |
| EP | 3567942 A1 | 11/2019 |
| EP | 3768006 A1 | 1/2021 |
| WO | 2014021610 A1 | 2/2014 |
| WO | 2016184401 A1 | 11/2016 |
| WO | 2017079574 A1 | 5/2017 |
| WO | 2018144873 A1 | 8/2018 |
| WO | 2019192435 A1 | 10/2019 |

OTHER PUBLICATIONS

3GPP, "3rd Generation Partnership Project; Technical Specification Group Radio Access Network; NR; Physical channels and modulation (Release 15)," 3GPP TS 38.211 V15.0.0, Dec. 2017, 73 pages.
3GPP, "3rd Generation Partnership Project; Technical Specification Group Radio Access Network; NR; Radio Resource Control (RRC) protocol specification (Release 15)," 3GPP TS 38.331 V15.1.0, Mar. 2018, 147 pages.
3GPP, "3rd Generation Partnership Project; Technical Specification Group Radio Access Network; NR; User Equipment (UE) procedures in Idle mode and RRC Inactive state (Release 15)," 3GPP TS 38.304 v0.1.2, Feb. 2018, 21 pages.
CATT, "Discussion on the Design of ABS Pattern and its Impact on the Measurement," R1-105935, Agenda Item: 6.8.3, 3GPP TSG RAN WG1 meeting #63, Jacksonville, USA, Nov. 15-19, 2010. (4 pages).
Chinese Office Action, issued Sep. 5, 2022, for Chinese Patent Application No. 201880088119.5. (12 pages) (English translation).
Extended European Search Report, dated Oct. 8, 2021, for European Application No. 18913437.2- 1231, 6 pages.
Huawei, HiSilicon, "Definition of Paging Occasion," R2-1803644, Agenda Item: 10.4.5.6, 3GPP TSG-RAN WG2 #101, Athens, Greece, Feb. 26-Mar. 2, 2018, 5 pages.
International Search Report, mailed Jan. 4, 2019, for International Application No. PCT/CN2018/082061, 2 pages.
Japanese Notice of Reasons for Rejection, dated Feb. 15, 2022, for Japanese Application No. 2020-548701 (10 pages with English translation).
Lien et al., "5G New Radio: Waveform, Frame Structure, Multiple Access, and Initial Access,"; IEEE Communications Magazine, Jun. 2017, pp. 64-71, 8 pages.
NTT Docomo, Inc., "Revised WID on New Radio Access Technology," RP-171418, Agenda Item: 9.2.1, 3GPP TSG RAN Meeting #75, West Palm Beach, USA, Jun. 5-8, 2017. (11 pages).
Panasonic, "Considerations for paging occasion design in NR," R2-1804632, Agenda Item: 10.4.5.6—Idle/inactive paging, 3GPP TSG-RAN WG2 #101, Sanya, China, Apr. 16-20, 2018,3; pages.

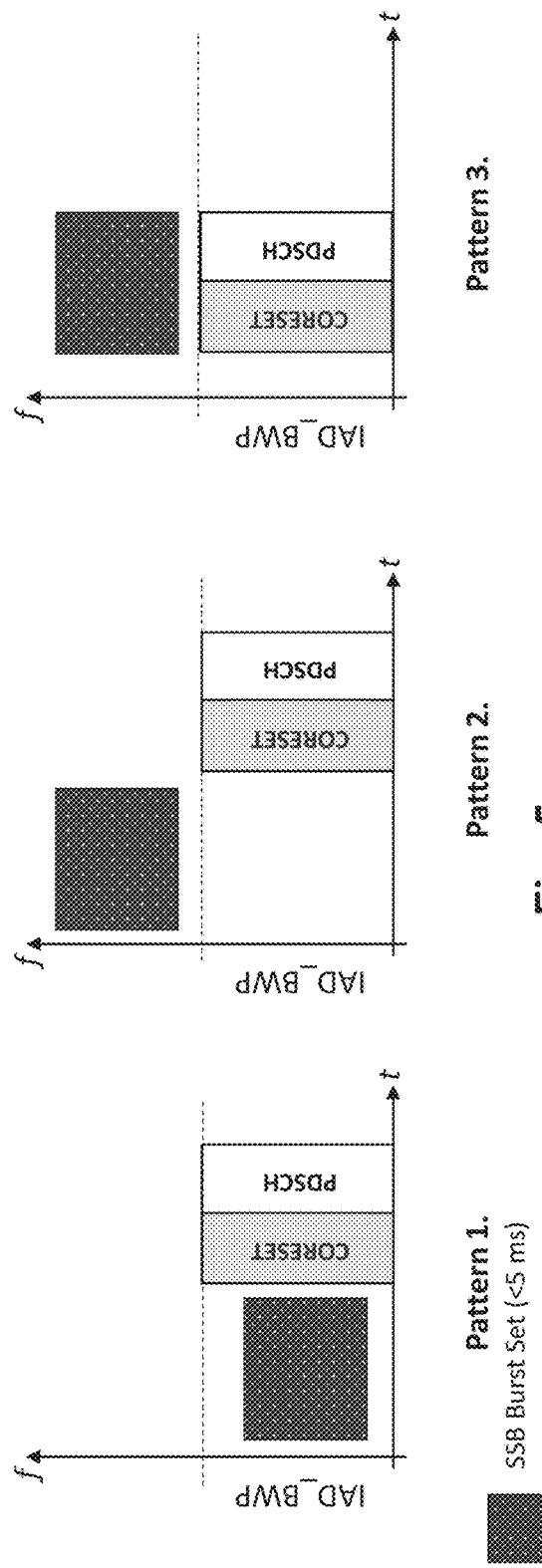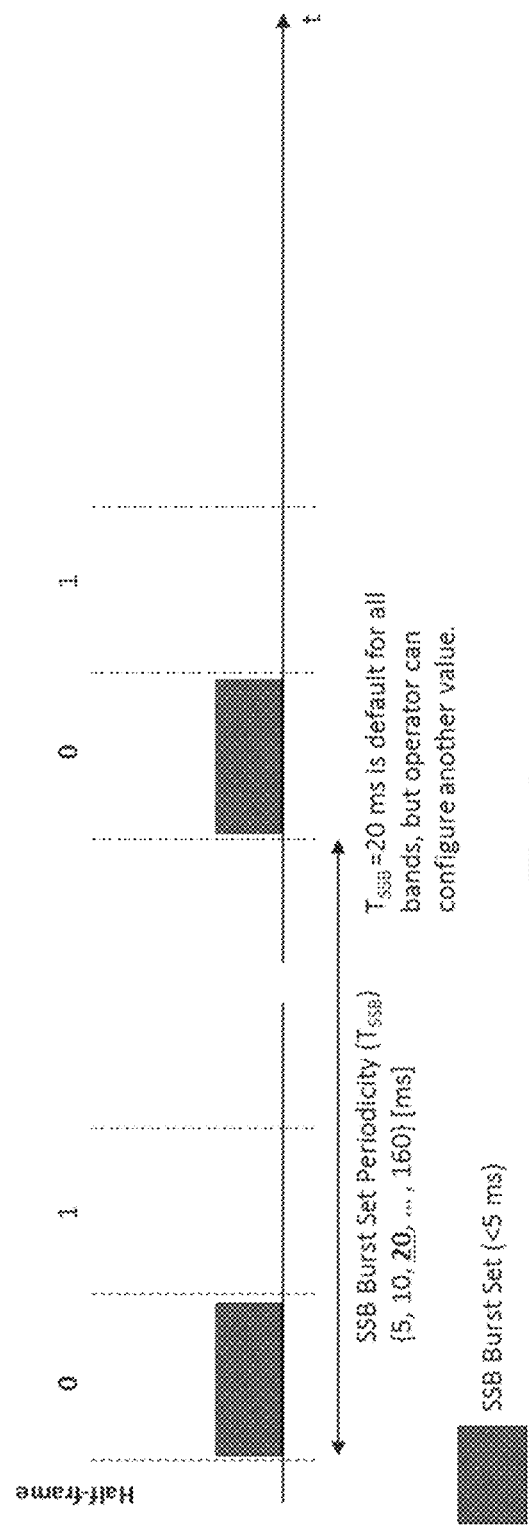
Fig. 5
Fig. 6

| Numerology combination {SSB SCS, RMSI SCS} [Khz] | L | RMSI CORESET duration [min, max] | Multiplexing pattern |
|---|---|---|---|
| {15,15} | 4 | [1,3] | 1 |
| {15,30} | 8 | [1,3] | 1 |
| {30,15} | 4 | [1,3] | 1 |
| {30,30} | 8 | [1,3] | 1 |
| {120,60} | 64 | [1,2] | 2 |
| {120,120} | 64 | [1,2] | 1 |
| {240,60} | 64 | [2,2] | 3 |
| {240,120} | 64 | [1,2] | 1 |

Fig. 7

| Frequency range [GHz] | L | SCS [KHz] |
|---|---|---|
| fc < 3 | 4 | 15 |
| 3 < fc < 6 | 8 | 30 |
| fc > 6 | 64 | 120, 240 |

Fig. 8

PAGING OCCASION DESIGN IN NEW RADIO

BACKGROUND

Technical Field

The present disclosure relates to paging of user devices in a communication system.

Description of Related Art

New Radio (NR) is the technology being developed by the $3^{rd}$ Generation Partnership Project (3GPP) to be submitted to the International Telecommunications Union as a 5G candidate technology. One of the most notable aspects of NR is the fact that it is being designed taking into account the operation using beamforming (Dahlman et al. "4G, LTE-Advanced Pro and The Road to 5G," 3rd Ed. Elsevier. 2016), which will be especially useful in high frequency bands. Broadly speaking, beamforming allows to concentrate the energy of a given radio transmission in a certain direction, such that the range can be extended to, for instance, compensate the high propagation loss in high frequencies. Given that 5G is expected to operate in high frequencies, where more spectrum is available, beamforming operation is key in NR.

BRIEF SUMMARY

One non-limiting and exemplary embodiment facilitates efficient monitoring of paging messages by a user equipment.

In one general aspect, the techniques disclosed here provide user device for transmitting and/or receiving data to/from a base station in a communication system comprising circuitry which, in operation: receives paging occasion configuration from the base station, including at least one parameter for configuring a predefined time-domain pattern for receiving paging occasion within a paging cycle; and performs reception of paging signal in the paging occasions within the predefined time-domain pattern configured according to the received paging occasion configuration.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

FIG. 5 is a schematic drawing illustrating different multiplexing patterns;

FIG. 6 is a schematic illustration of SSB mapping into the first half-frame;

FIG. 7 is a table exemplifying relation between duration in symbols of RMSI CORESET and the respective multiplexing pattern for different numerologies;

FIG. 8 is an table exemplifying relation between frequency bands, synchronization signal length and numerology for NR;

DETAILED DESCRIPTION

Figure 2:
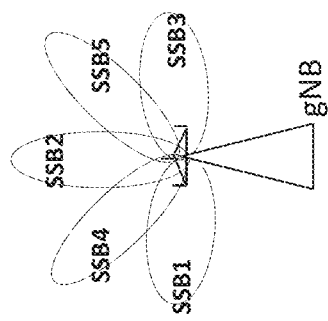
FIG. 2 is an illustration of beamforming performed by a base station.

In order to support beamforming operation, several aspects of NR, including functionalities like time/frequency synchronization and paging, among others, need to be re-designed. This disclosure regards paging design in NR.

An important functionality in mobile cellular systems (also in NR) is the paging mechanism, by which the network locates UEs with incoming traffic (voice calls or data). The antenna beams provide more range (distance between the base station and user device to communicate with each other) but their coverage is narrower than the conventional tri-sectorial cells. Since paging is about localizing a UE within a cell (or group of cells), paging operation needs to be adapted to the beam-sweeping operation in NR. Thus, some design principles from LTE can be inherited in NR but other notions, such as paging occasion definition and paging occasion resource allocation need to be adapted.

In the context of cellular systems, paging is a mechanism by which the network locates a User Equipment, UE, (in IDLE mode) within a given geographical area referred to as tracking area, possibly composed of several cells, to initiate a connection setup. Since the network does not know the exact geographical position of the UE to be paged, beamformed paging messages (used in NR) need to be transmitted in different directions at different time instants in order to guarantee that the UE to be paged is found. Here, the term "network" mainly refers to a base station (also referred to as gNB in NR) with which the UE communicates via wireless interface and which is connected to the rest of the network. The UE is any mobile station implemented for instance in a terminal such as mobile phone, smartphone, tablet, laptop, PC, or any other device.

It is noted that the paging design of this disclosure may be applied to two modes in the NR, namely to RRC_IDLE state and RRC_INACTIVE state. These are commonly referred to as IDLE and INACTIVE modes. These modes apply according to 3GPP TS 38.304 v0.1.2 (2018-02): when the UE is camped on a NR cell; and when the UE is searching for a cell to camp on. A UE is camped on a cell if it has completed the cell selection/reselection process and has chosen a cell. The UE monitors system information and (in most cases) paging information in these states. The RRC_IDLE state and RRC_INACTIVE state tasks can be subdivided into three processes: PLMN selection; cell selection and reselection; location registration and RNA update. Cell selection is only applicable to RRC_IDLE state.

However, the present disclosure is not limited to the very particular NR states. In general, it is applicable to any UE state in which the cell broadcast and paging channels are monitored. This is typically (not only in NR but also in LTE or other systems) the case when there is no current data bearer configured and no pending communication between the UE and the base station. If there is an exchange of data and signaling between the UE and base station, then the control information may also be transmitted over such links, i.e., faster than monitoring the paging channel. In the following, when referring to IDLE_MODE, any idle mode such as the NR modes mentioned above is meant. Thus, an IDLE UE is any UE in an IDLE_MODE.

The overall paging design and operation comprises two interconnected problems:

1) PO structure design. This is about determining the length and composition of each individual paging occasion. In LTE, the notion of PO refers to both paging frame and subframe in which a given UE has to monitor paging Downlink Control Information (DCI). In NR, the PO has been agreed to be composed of one or more slots which duration is such that a complete beam sweeping of paging signals can be allocated. Indeed, each PO must contain one CORESET associated (and quasi-colocated) to each SSB. Thus, with a variable number of beams in a cell, the length of POs is also variable and would depend on the maximum number of Synchronization Blocks (SSBs), i.e., the parameter L which in turn depends on the numerology, or the number of actually transmitted SSBs, let us say a variable L'<L. In addition, for a given L, it is also possible to take several approaches. For instance, a certain L-specific length allowing blanks within the PO in time-positions where SSBs are not transmitted or using a length that directly depends on the number of actually transmitted SSBs (L'). In any case, variable length PO needs to be considered in NR, and hence, the next problem, that of allocation of POs must take this factor into consideration.

2) PO allocation. This is about the allocation of the different POs within the system's paging cycle. In LTE, system's paging cycle is indicated as system information and it is assumed as default by UEs unless UE-specific configuration (UE-specific DRX cycle) is provided. Then, UEs are distributed among the different POs by means of mod-type operations, while the number of POs depends on the paging-load and can be modified. The same principles apply to NR, however, there are some important differences. Paging CORESET has been agreed to reuse the same configuration as RMSI CORESET, which means that paging CORESETS at least for RRC_IDLE are transmitted within the initial active downlink bandwidth part (IAD_BP). This bandwidth part may or may not overlap with the bandwidth in which SSBs are transmitted, and hence, collisions between CORESETs and SSBs (and among different CORESETs) must be avoided. All in all, the PO allocation strategy should flexible enough to be applied and adapted to several other cell-specific configurations, such as the SSB-CORESET multiplexing pattern (pattern 1, 2, or 3, see [3]), or SSB periodicity.

A similar behavior has been already agreed for the synchronization signals providing time and frequency reference to the UE, i.e., these signals are beam-swept (i.e., transmitted on different beams in different time instants) in the cell in such a way that UEs can access the system after obtaining the time-frequency reference and some other information from the so-called Synchronization Signal Blocks (SSBs).

The term "pre-synchronization" refers to a design principle that has been discussed in some standardization meetings. Especially for fast moving UEs in IDLE_MODE, it is desirable or even necessary to receive the synchronization block before attempting to receive and decode the paging occasion. As the UE is moving fast, time and frequency reference is potentially degraded, so IDLE UEs would need to "update" (re-sync) before receiving the paging. Hence, having the POs after SSBs is just desirable.

Hence, given that SSBs and paging signals present a similar behavior, i.e., both need to be beam-swept, it is expected that certain associations or relationships can be exploited. SSBs are blocks of resources consisting of a predetermined number of symbols in time domain, for instance four symbols, and a predetermined number of subcarriers or physical resource blocks. The number of symbols and/or sub-carriers or physical resource blocks may be defined in a standard or configurable in system resources. The SSB may carry Primary Synchronization Signal (PSS), Secondary Synchronization Signal (SSS) and the Physical Broadcast Channel (PBCH).

With respect to LTE, one fundamental change in NR is the fact that, due to beam-seeping operation, the length in term of OFDM symbols or slots is not fixed because a PO has to contain as many paging COnfiguration REsource SETs (CORESETs) as synchronization blocks (beams). In addition, paging CORESETs (as well as Remaining Minimum System Information, RMSI, and Other System Information, OSI) are to be confined within a certain specific bandwidth portion called Initial Active Downlink Bandwidth Part (IAD_BP). The bandwidth to be used for the synchronization blocks may or may not overlap with the IAD_BP. In case of overlapping, collisions are not allowed in general. Thus, the problem of paging occasion allocation, that of determining the time and frequency resources for the paging CORESET is not trivial, and a unified framework (i.e., applicable to all relevant paging-affecting configurations) for NR is encouraged.

This disclosure provides several strategies to address the aforementioned problem by providing a common framework that allows gNBs to flexibly allocate the POs taking into account other operator-defined configurations, such as the number of SSBs, the multiplexing pattern, system numerology, and so on. The allocation strategies also allow avoiding collisions among control signals, while maintaining the required common control signaling overhead (system information) acceptable and without need for additional UE-specific signaling, except for cases where UE-specific configuration is required.

This disclosure relates to on-going work item on NR access technology (RP-171418—"Revision of WI: New Radio Access Technology," S. Y. Lien, S. L. Shieh, Y. Huang, B. Su, Y. L. Hsu and H. Y. Wei, "5G New Radio: Waveform, Frame Structure, Multiple Access, and Initial Access," in IEEE Communications Magazine, vol. 55, no. 6, pp. 64-71, 2017). It is relevant to the "initial access" framework. Initial access includes, among other things, synchronization signals and paging design. In particular, some embodiments provide mechanisms by which paging messages are embedded into the resources of the NR system, to make more efficient the paging reception at UE side. However, the present disclosure is not limited to being employed in the NR and may readily be applied to other mobile and/or cellular communication systems in which the UE has to be paged.

The following points summarize the paging operation in the predecessor Long Term Evolution (LTE) system, and highlight the similarities and differences in NR.

Paging is used to locate UEs in the tracking area, to initiate a setup connection, when UE is in IDLE mode. Therefore, in the LTE, a paging message is broadcasted in each cell of the tracking area. This operation based on tracking areas is similar in the NR.

In LTE, to receive paging messages, a mechanism similar to data transmission is used: a UE first receives and monitors control information (L1/L2 signaling meaning layer 1/layer 2 signaling which refers to physical layer and MAC layer) to know where and when the actual paging message is transmitted. Hereafter, this L1/L2 signaling and the actual paging message are referred to as paging DCI (Downlink Control Information) and paging message, respectively. DCIs are carried on a Physical Downlink Control Channel (PDCCH). This behavior is also adopted in the NR, at least as baseline. Moreover, in the context of the NR, the paging DCI is contained in a set of resources generally called CORESET. Thus, the UE needs to locate and receive the paging CORESET in order to receive the paging message. In other words, CORESET is a set of time-frequency resources where a UE monitors PDCCH (DCI) reception.

In the LTE, the paging DCI/message are broadcasted in the cells of the tracking area, while in the NR, beam operation is supported in general, i.e., paging messages are transmitted in different directions in different time slots.

In order to allow an energy-efficient operation in the LTE, the IDLE mode UEs sleep most of the time, and wake up only when they are potentially paged. The time-instances in which UEs can be paged are called Paging Occasion (PO), and hence, a paging cycle is defined. By means of predefined formulas, using the UE ID and other parameters, each UE determines when, i.e., the PO (frame and subframe), it must monitor paging. Hereafter, this is referred to as PO calculation. In the NR, similar behavior is expected, although with some differences. The UEs also determine the time-location of their corresponding PO, i.e., from the UE perspective a particular PO among the POs in the paging cycle for which the reception is performed by the UE, using a predefined formula, and monitor such POs periodically. To support beam sweeping operation, PO is defined as a time interval, possibly composed of several time-slots (in which all the required beams are transmitted). Thus, in principle, the UE listens during the whole PO interval to verify whether a paging message, relevant to it, has been sent.

In LTE, PO indicates a frame and a subframe in which the paging DCI is possibly transmitted (using a reserved ID: P-RNTI, i.e., Paging Radio Network Temporary Identifier which is a group ID). In the NR, the operation is more flexible. The paging CORESET can be transmitted in different OFDM symbols (hereafter referred to as symbols) within the slot, and its duration is also variable, i.e., paging CORESET duration can be one or more symbols. Thus, to indicate a UE the exact time-location of the paging CORESET to be monitored, an indication with resolution of symbols is required. The slots are composed of 14 symbols in the time domain. Paging message details are defined in 3GPP TS 36.331, Section 6.2.2, version f.1.0 or TS 38.331, v. 15.1.0. In the NR, a time-structure similar to the LTE is adopted, but with differences due to the use of different numerologies. The (radio) frame of 10 ms is preserved, as well as the subframes of 1 ms; but the number of slots within the frame depends on the numerology, thus, for 15 KHz we have 1 slots per subframe, for 30 KHz we have 2 slots per subframe, and so on. The number of OFDM symbols per slots is the same (14) regardless of the numerology, cf. 3GPP TS 38.211 V15.0.0 (page 8 and 9).

In other words, Paging Occasion is a set of slots (continuous or distributed) in which a UE monitors paging-PDCCH (also referred to as type-2 PDCCH). A PO is defined as the time interval over which paging signals are transmitted and, as mentioned, it is composed of one or multiple time-slots. Paging signals include paging DCI and paging message. As described above, paging DCI is transmitted on type-2 PDCCH, with configuration provided by a higher layer parameter paging-SearchSpace (higher layer here refers to RRC protocol). Paging message is transmitted through PDSCH. In principle, the paging DCI and paging message may be time-division multiplexed and/or frequency-division multiplexed.

The paging cycle is also referred to as discontinuous reception (DRX) cycle in the context of 3GPP specifications such as LTE and NR. It is noted that in general, the paging cycle in which base station provides paging occasions (referred to as system paging cycle or a paging cycle from network point of view) may differ from the paging cycle in which a particular one UE accesses (performs reception for) certain among the POs provided by the network (also referred to as UE-specific paging cycle, or paging cycle according to point of view of the UE). The present disclosure is applicable for the system paging cycle which may also correspond to the UE paging cycle. Moreover, as described later on, embodiments are provided for cases in which UE-specific paging cycle is provided for a UE.

From UE point of view, it is one period with POs, which is repeated. Specific values are not yet set for NR, but particular value is immaterial for the present disclosure which may work with any value. It has been discussed that the minimum DRX cycle is 32 frames, i.e., 320 ms. The eNB can configure UE-specific DRX cycle, different from the default system's paging cycle which is informed to UEs as system information.

The period for POs (paging/DRX cycle) may or may not correspond to the period of the SSBs ($T_{SSB}$) $T_{SSB}$ is the periodicity with which synchronization blocks are transmitted. This value may be selected from the following set: {5, 10, 20, . . . , 160} [ms]; with 20 ms being the default value for all the bands; but operator can adjust this value.

Number of POs denotes the number of POs in the system's paging cycle ($N_{PO}$). Depending on paging capacity requirements, gNB can configure another suitable $N_{PO}$. Hence, the number of POs could range, for instance, from 32 to 128. It is possible to page up to 16 UEs per PO (actual UE IDs are in the paging message). In the paging occasion, if paging CORESET with P-RNTI appears, then it indicates to the UE that there is a paging message that the UE need to decode. How/where the paging message is, is a scheduling matter. It is in the paging messages where UE IDs are used to distinguish between messages of different UEs.

As mentioned above, Paging Occasion Calculation (POC) is a mechanism (e.g., formula and/or algorithm) by which a UE determines the ordinal of the PO it belongs to. Parameters to the POC may include UE identity (e.g., IMSI, International Mobile Subscriber Identity) and some system parameters (e.g., nB which is a number of POs per paging cycle in the LTE and may also be applied in NR or another system).

One key aspect of the NR is the support for beamforming based operation. One important function in cellular system is to provide a reliable time-frequency reference for the UEs. While in LTE the signal used for this purpose is broadcasted in the cell, in the NR, this signal needs to be transmitted in different directions (beams) at different time instants. Thus, SSBs are defined containing time-frequency reference and information to allow a UE to access the system. Since the SSBs are respectively transmitted in all directions, it is possible, in principle, for a UE to catch, i.e., to be able to successfully receive, at least one of those time-multiplexed SSBs, and eventually access the system. Hence, a UE is self-located by means of the SSB it receives. Since 1) these signals are monitored periodically for other purposes, e.g., radio resource management, and 2) in principle even IDLE UEs can always determine the SSB they belong to, then it is possible to use this knowledge to locate the corresponding paging CORESET within the PO, as long as some association exists, and it is signaled to or known by the UEs. A PO contains paging CORESETs corresponding to all the SSBs (i.e., beams) and its duration corresponds to the period required to beam-sweeping the paging signals.

In the LTE and likely also in the NR, in case of initial synchronization (when the UE is not already camping on or connected to an LTE cell) after detecting the synchronization signals, the UE decodes the Physical Broadcast CHannel (PBCH), from which critical system information is obtained. In particular, the PSS and SSS are transmitted periodically and enable the terminal to acquire slot boundary timing. Then, the PBCH of the cell may be read carrying configuration information. Configuration information may be a common configuration information which is to be read by all terminals and/or a group of terminals. This may include for instance the configuration of the cell resources such as paging resources. The RMSI (Remaining Minimum System Information) and OSI (Other System Information) are resources pointed to from the PBCH and also carrying (cell) broadcast common information to be read by any terminal in the cell. This information may also carry configuration. The configuration information may be carried by the resource control protocol (RRC).

Figure 1:
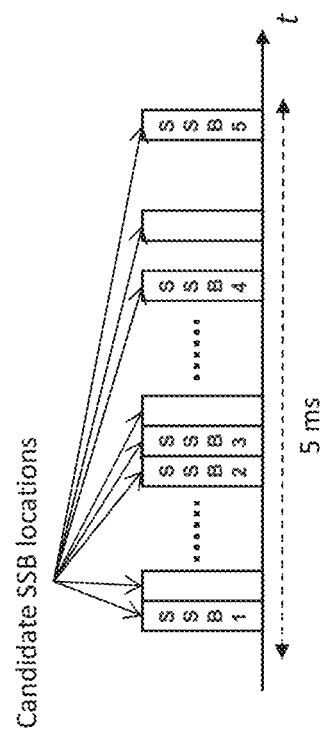
FIG. 1 is a schematic drawing of the allocation of synchronization blocks in resources.

FIG. 1 depicts the rationale of using several blocks as a mean for time/frequency synchronization in NR. The candidate SSB locations, as well as the total number of them, may be provided in the specification and they are numerology-specific, with a maximum of L=64 SSB for subcarrier spacing of 240 KHz. A numerology is defined by subcarrier spacing and cyclic prefix (CP) overhead. In FIG. 1, candidate locations are represented as boxes. In this representation, 5 out of L=8 possible SSB are actually transmitted (indicated by their respective SSB index, "SSB1," "SSB2," etc.) by the network and signaled through RMSI. In general, the base station (referred to in NR as gNB and similar to the eNB/eNodeB of LTE) transmits the different SSBs using different beams in different time-instants to cover the cell/sector, as illustrated in FIG. 2.

It should be noted that a UE monitors the SSB in order to perform some other functions, e.g., Radio Resource Management (RRM) (for instance handover), and hence, UE is aware of the best received beam. Moreover, since the gNB does not know the location of IDLE mode UEs within a tracking area, paging messages also need to be beam-swept, thus a natural design is to associate the operation of SSB and paging.

A key agreement for this disclosure among the above agreements states that QCL (Quasi-colocation) between SSBs and paging (DCI/message) can be assumed by the UEs. The notion of quasi-co-location (QCL) means that, the radio channels experienced by signals transmitted by different antenna ports have the same large-scale properties (e.g., average delay spread, Doppler spread/shift, average gain, etc.) if and only if they are quasi-co-located. In practice, it means that signals corresponding to two different channels (e.g., SSBs and paging) are transmitted from the same Transmission and Reception Point (TRP), using the same beam construction. In other words, each SSB transmitted with a unique index has its corresponding paging signals transmitted using the same beam. The agreement creates a link between each SSB and the paging messages through QCL. Association between the SSBs and CORESETs is to be indicated by means of the RMSI.

Another agreement made so far concerns the fact that the RMSI, OSI and paging shall share the same CORESET configuration, defined within the IAD_BP. IAD_BP refers to Initial Active Downlink Bandwidth Part which is defined as the bandwidth of the RMSI, i.e., by location and size. Moreover, different multiplexing patterns between the SSBs and RMSI/OSI/paging CORESETs are to be considered.

Figure 3B:
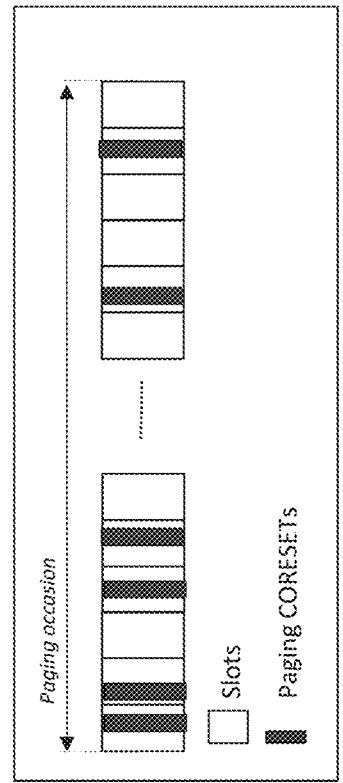
FIG. 3B is an illustration of the slots for a paging occasion filled with paging CORESETs.
Figure 3A:
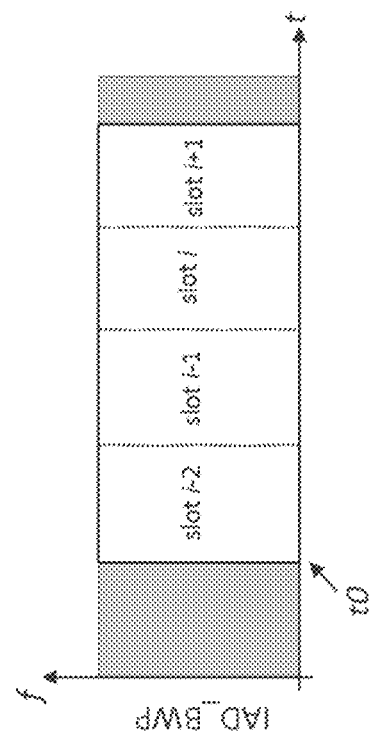
FIG. 3A is an illustration of the slots for a paging occasion.

FIG. 3A shows a PO, which starts at the time instant t0 and includes slots i−2, i−1, i. and i+1 in the IAD_BP. It is noted that the term "IAD_BP" is used in this disclosure synonymously with the acronym "IAD_BWP."

FIG. 3B shows another example of a PO with some of the slots including paging CORESETs (PC). In particular, in paging occasion calculation, the starting point (t0) should be determined. This has to be done taking into account the transmission of RMSI and OSI CORESET (as they are also transmitted within the IAD_BP). The understanding is that the paging CORESET does not overlap (does not collide in time) with RMSI/OSI CORESET. RMSI CORESET, OSI CORESET, and paging CORESET are all allocated within the IAD_BP. So, they are located in the same frequency portion. However, they cannot overlap in time, which is achieved by gNB configuring them. Thus, in case of a "Pattern 1" in which the SSBs and the paging CORESET are in the same band IAD_BP, the transmission pattern of the SSBs, is taken into account. The transmission pattern of SSBs typically takes approximately a half-frame (i.e., 5 ms window) every $T_{SSB}$.

Figure 4:
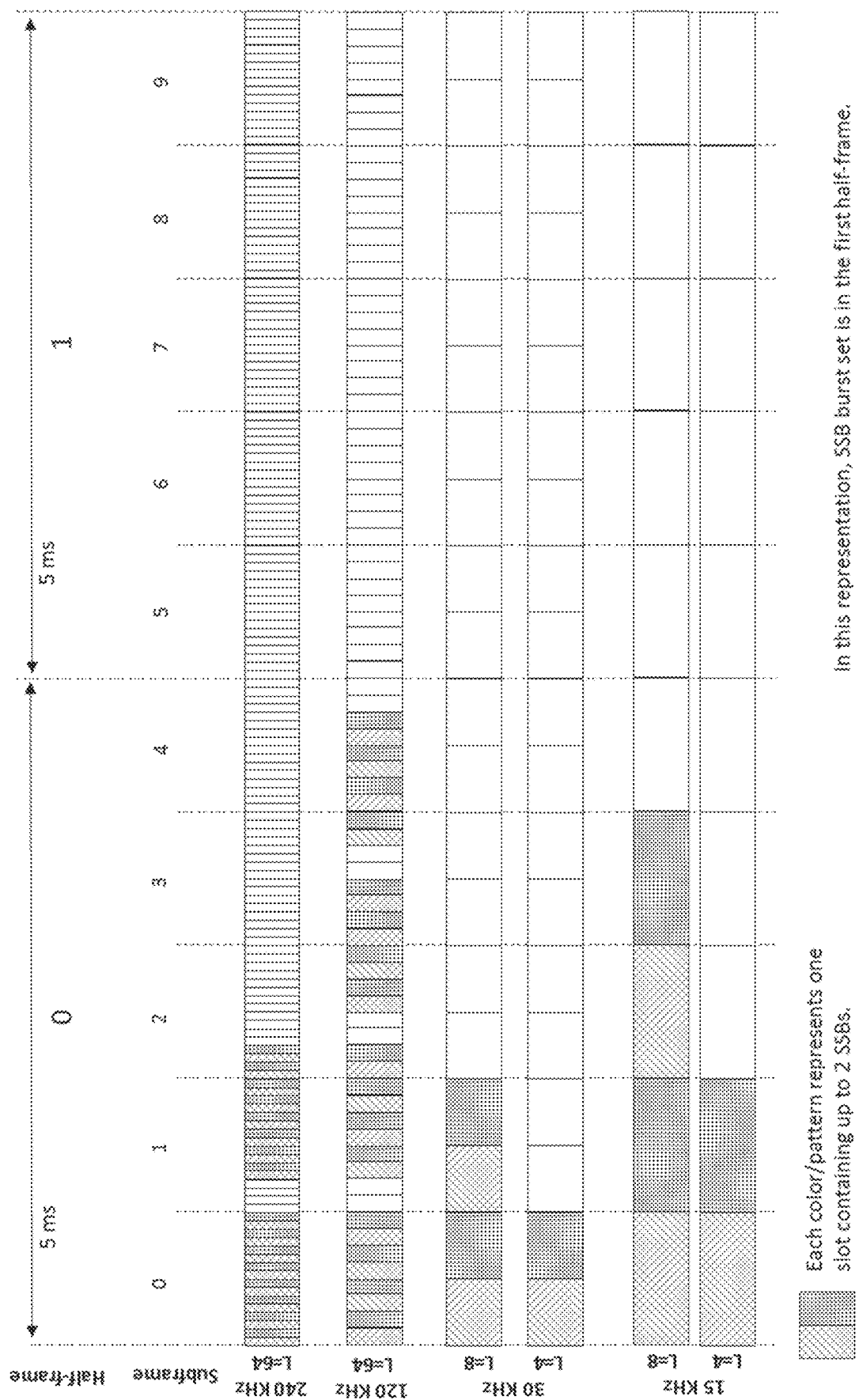
FIG. 4 is a schematic illustration of different NR numerologies and the corresponding SSBs.

In particular, FIG. 4 shows framing in NR with SSB burst set. In this exemplary representation, SSB burst set is in the first half-frame. In NR, a frame has 10 ms and correspondingly a half-frame has 5 ms. Each half-frame has 5 subframes which are further divided into slots. The number of slots differs for different frequency bands (i.e., numerologies). In FIG. 4, the slot-level structure includes slots (shown with different fill-patterns), each slot containing up to two SSBs. L is the maximum number of SS Blocks (SSBs) in bursts. In particular, when looking at FIG. 4, in each slot, up to two SSBs may be mapped. For example, in 15 KHz band, L=4, there is one burst in two neighboring slots of the first half-frame and it is assumed that each of the slots carries the two SSBs. For the same frequency band and L=8, there is still one burst over 4 slots with up to two (all together 8) SSBs. For 120 KHz band with L=64, there are four SSB bursts in a set.

FIG. 5 shows the 3 possible multiplexing patterns for SSB burst set 510, CORESET 520, and PDSCH (data channel) 530.

"Pattern 1" refers to the multiplexing pattern in which the SSBs (SS/PBCH block) and the RMSI CORESET occur in different time instances, while the transmission bandwidth for the SS/PBCH block and the initial active DL BP containing RMSI CORESET overlap.

"Pattern 2" refers to the multiplexing pattern in which SS/PBCH block and RMSI CORESET occur in different time instances, while the transmission bandwidth of the SS/PBCH block does not overlap with the initial active DL BP containing RMSI CORESET.

"Pattern 3" refers to the multiplexing pattern in which SS/PBCH block and RMSI CORESET occur in the same time instance, and the transmission bandwidth of the SS/PBCH block and the initial active DL BP containing RMSI CORESET do not overlap.

Moreover, FIG. 6 shows periodicity of an SSB burst set. In general, an SSB burst set has a duration smaller than 5 ms, i.e., smaller than a half-frame (the half-frame that is used is indicated by the network, e.g., "0" indicates a first half-frame and "1" a second half-frame). In FIG. 6, the SSB burst periodicity is set to 20 ms ($T_{SSB}$=20 ms is a default but an operator may configure a different value). In general, currently, the periodicity may be selected out of the values {5, 10, 20, 1 . . . 160}. The periodicity configuration is particularly important for multiplexing pattern 1 since it has to be ensured that the SSBs and RMSI CORESETs do not overlap.

FIG. 7 shows that SSBs and RMSI CORESET can have different numerologies and specifies for different frequency ranges the number of SSBs and numerology (Sub-Carrier-Spacing, SCS). For example, based on the table in FIG. 7, possible CORESET durations (in symbols) are follows:

Pattern 1: {1,2,3}, pattern 2: {1,2}, and pattern 3: {2}.
RMSI CORESET configuration depends on SSB/RMSI numerology combination as well as the multiplexing pattern.

This configuration is re-used by OSI and paging.

FIG. 8 shows relation between frequency bands, SSBs and numerology. In particular, it has been agreed that the maximum number of SS-blocks within SS burst set, L, for different frequency ranges are as follows:

For frequency range up to 3 GHz, L is 4
For frequency range from 3 GHz to 6 GHz, L is 8
For frequency range from 6 GHz to 52.6 GHz, L is 64 Just a clarification. The value 'L' is the maximum number of SSBs that can be transmitted. The operator can decide to use less beams. How many beams are used, and when, they are transmitted (in a predefined set of candidate location for the SSBs) is indicated by the network.

In general, it is desirable to avoid the UE to monitor the whole PO where several paging CORESET are transmitted using different beams, which can be inefficient (energy costly). Hence, taking advantage of the QCL is a preferred approach.

Thus, the present disclosure relates to allocation and design of paging occasions.

Figure 9:
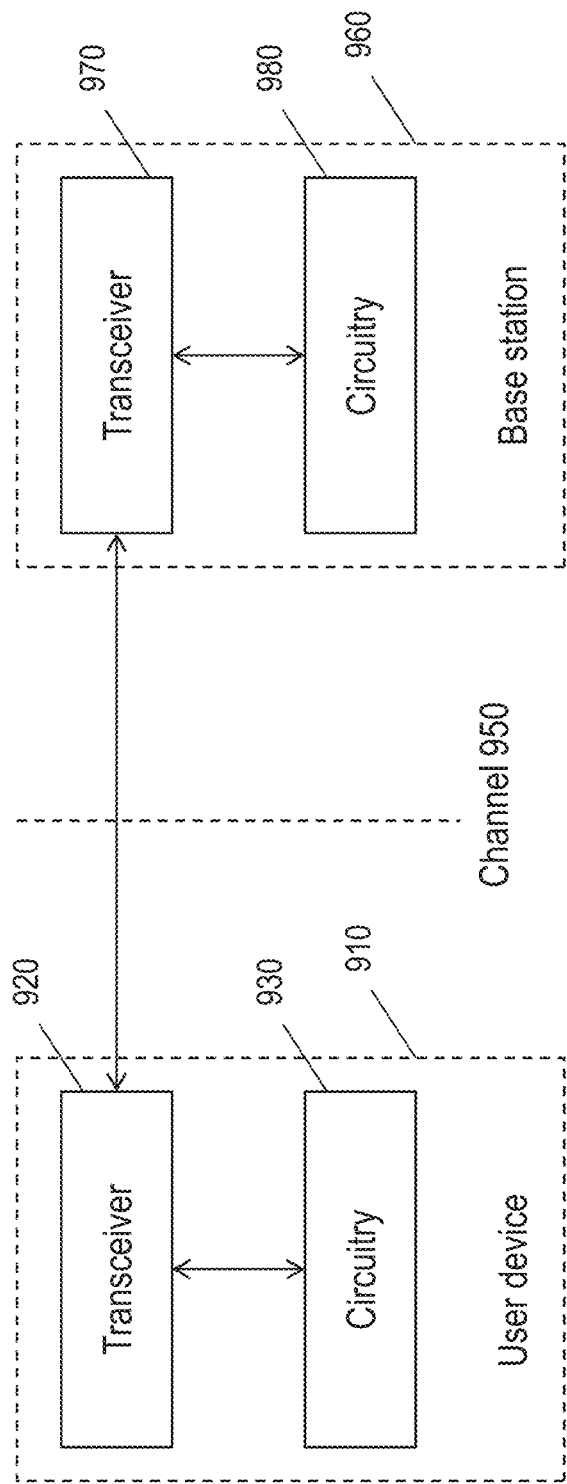
FIG. 9 is block diagram illustrating an exemplary user device and base station.

A user device and a base station corresponding to an exemplary embodiment of the present disclosure are shown in FIG. 9. The user device 910 (i.e., user equipment (UE) or user terminal) and the base station 960 (i.e., a gNB of NR) communicate with each other over a wireless channel 950.

The present disclosure relates to transmission and reception of paging signals and in particular to determination of location and/or length for the paging signals. In particular, it relates to determining the location and length of the paging occasions taking into account beam-sweeping operation such as the one used in NR.

Moreover, in some embodiments, additional constraints (which may follow from some desirable design principles discussed in 3GPP) to take into account include: pre-synchronization, avoiding CORESETs collisions, and load-adaptation (i.e., paging capacity should be at least equal to LTE and adjustable). In general, a unified framework is desirable. It means that we have a solution that can be applied (perhaps with different configuration) regardless of the other settings of the cell and not a fragmented solution that, for instance, if some parameter of the cell change, require another solution. In other words the basis of having a predefined time-domain pattern for paging occasions while providing a parametrization for configuring the pattern provides for such a unified framework.

In order to efficiently signal the paging information, in some embodiments, the location of the paging information is determined by a parameterized predefined pattern which is configured by means of at least one parameter for the user devices by the network (e.g., the base station). The term "predefined" for patterns means that there is a certain rule followed by the pattern, such as a regularity of PO occurrence in time, or in other words a constraint limiting possible temporal locations of the PO. The term "parameterized" means that as long as the predefined pattern is followed, the particular PO locations in time may be varied by a parameter. In particular, paging occasion allocation is based on predefined time-domain allocation strategies which use the whole paging cycle as a timeframe, and whose parameters may be set in dependency on a required paging capacity and beam-sweeping (SSB) pattern of the cell.

In general, paging information may be transmitted by the network (e.g., base station on the wireless interface) in a paging region of the system resources. The paging region is to be read by a group of terminals. In order to save power, the terminals only read paging resources which are configured to carry the paging information, among the resources generally configurable by the network to carry the paging information.

According to an embodiment, the user device 910 shown in FIG. 9 comprises a transceiver 920 including a transmitter and/or receiver for transmitting and/or receiving data to/from the base station, and circuitry 930. The circuitry 930 in operation receives via the transceiver 920 paging occasion configuration from the base station, including at least one parameter for configuring a predefined time-domain pattern for receiving paging occasion within a paging cycle. The circuitry 930 then performs reception (via the transceiver 920) of paging signal in the paging occasions within the predefined time-domain pattern configured according to the received paging occasion configuration.

The user device may be any device implementing UE functionality in a standard like LTE or NR. In other words, it can be a mobile phone, smartphone, a receiver implemented in a laptop, tablet, computer or any terminal device such as a machine-to-machine communication device. The user device may also have relay functionality.

A base station 960 for transmitting and/or receiving data to/from a user device in a communication system comprises processing circuitry 980 which, in operation transmits (via transceiver 970) paging occasion configuration to the user device, including at least one parameter for configuring a predefined time-domain pattern for receiving paging occasion within a paging cycle; and which transmits (via transceiver 970) paging signal in one or more of the paging occasions within the predefined time-domain pattern configured according to the received paging occasion configuration.

The base station may be in general any wireless interface to a network in which paging is applied (cellular network). For example, the base station may correspond to an eNB in the LTE or gNB in the NR or to any similar station. The base station may also be a relay providing wireless interface to the user device(s).

The respective transceivers 920 and 970 include the transmitter and receiver. The transmitter and receiver may be of any known construction, including an antenna (antenna array for beamforming), amplifiers, and possibly further electronic for transmitting/receiving of the signal in the desired time and frequency resources. On the other hand, the processing circuitries 930 and 980 implement baseband processing such as transmission and reception of signaling and data meaning that the signal received over the respective transceivers 920 and 970 is processed and the signaling and data are extracted (i.e., demodulated, decoded) and interpreted. Moreover, the circuitry may map signaling and data onto the resources for transmission over the respective transceivers 920 and 970. The transceivers enable communication over a channel 950 which is formed by certain physical resources such as frequency band for transmission and/or reception and time.

As also mentioned above, in these embodiments, the synchronization and paging procedures share some common features such as being transmitted from the same (or substantially the same) transmission and reception point (TRP), such as a base station, using the same beam construction. Thus, it is practical to associate these two procedures. The synchronization resources are referred to as synchronization blocks (SSBs). One SSB may be defined by its location among the communication system resources. For example, in NR, the SSBs may be given as blocks in the time-frequency grid, i.e., as a certain number of symbols (in time domain) and subcarriers (in frequency domain).

The user device 910 and the base station 960 as described above thus make use of predefined time-domain patterns for PO which use the system paging cycle as a reference. The predefined time-domain patterns are parameterized so that they are configurable by the base station 960. In particular, the parameterization may have as an input some parameters which are generally configurable by an operator of the communication system. Such inputs may be, for instance one or more of:
  a multiplexing pattern (such as those described above with reference to FIG. 5) defining mutual location of the synchronization signal blocks and the system information blocks. This parameter may additionally resolve possible collisions in locations for the synchronization signal blocks (SSBs) and the RMSI CORESETs. Moreover, pre-synchronization may be taken into account. This may be achieved by ensuring that the synchronization signal blocks regularly precede the paging occasions so that IDLE UEs can update their synchronization (i.e., re-synchronize) shortly before receiving the paging.
  beam-sweeping configuration, and in particular, the maximum SSB length L, and/or the actual SSB length L'. These parameters may impact the necessary PO length.
  paging capacity, in particular a number of POs per paging cycle.

The PO configuration then may include the predefined rule. The rule can be for instance a definition of a raster in time domain which constraints possible PO locations. Alternatively, the rule may be uniform distribution of POs over the paging cycle. These exemplary rules will be described below in detail. Additional constraints on the location of POs within the raster or uniform distribution rule may be provided by further parameters and design rules. The further parameters may include adjustable cell parameters such as paging capacity or the like. One of possible design goals may be that both schemes, raster and uniform location of POs within the paging cycle, operate with any multiplexing pattern (with or without bandwidth overlapping).

Paging Occasions Located on a Raster

One example of the pattern and parameterization is as follows: The predefined time-domain pattern specifies that the paging occasions are only allowed to be present in a regular raster within the paging cycle; and the paging occasion configuration indicates in which raster positions the reception of the paging occasions is to be performed.

In particular, in this embodiment, a raster is defined in time-domain over the system's paging occasion cycle. The raster points correspond to candidate locations (possible starting points) of POs. Such raster is illustrated on the left hand side of FIG. 10. An offset relative to the start of the paging cycle may define the raster location. The offset may be fixed (predefined in a standard) or configurable (e.g., within system information by a base station). Moreover, the raster spacing corresponds to the smallest possible PO spacing. Here, POs may be located (i.e., may start) in all raster points. POs cannot start in locations other than the raster points. Moreover, not each raster point necessarily incudes a PO. The actual PO locations may be given by further constraints.

Multiple rasters with different granularities may be defined so that a selection out of a predefined plurality of raster configurations is possible for a base station or an operator operating the communication system including the base station. In other words, the paging occasion configuration transmitted from the base station to the user device may indicate one of a predefined plurality of rasters. In this case, the rasters may be assigned respective identifiers and the signaling from the base station to the user device include specifying the identifier of the selected raster out of the plurality of rasters.

In another example, the raster may be parameterized by directly signaling the selected raster spacing (e.g., a parameter defining distance between neighboring raster points).

It is assumed that the raster has equidistantly spaced raster points (illustrated as triangles in FIG. 10), i.e., points located with the same distance between each pair of neighboring raster points. The selection of the raster may also be determined implicitly according to the remaining cell configuration such as paging capacity, maximum SSB length or the like.

The actual presence of POs in the raster points may then be signaled or derived based on further constraints or a combination of signaled and derived. For example, the presence of the PO may be signaled by:
  a bitmap. The bitmap may include bits wherein each bit represents a respective raster point. A bit then indicates with a first value (1 or 0) that the PO is present on the respective raster point associated with that bit and with a second value (0 or 1) that the PO is not present on the respective raster point. Signaling the bitmap provides a full flexibility in configuring the PO presence within the raster. On the other hand, it may cause a large overhead. This bitmap option is more suitable in cases where L is small, as its use would not represent a large overhead in absolute terms (few bits, e.g., <8 would be enough for L=4 ... 8). If we have L=64, it is likely that the raster would be in the order of 80 bits or so, and hence, transmitting a bitmap of 80 bits may be restrictive because this is system information usually designed to be as small as possible. Thus, for large values of L, short-patterns mentioned below may be a more efficient option.

repeated short-patterns. In practice, it is possible to have many POs within the paging cycle, for instance, 128. In such a case, a raster with at least 128 points is necessary. Thus, in order to signal to the presence of POs for that raster by the above mentioned bitmap, 128 bits would be required (leading to a rather large bitmap). A possibility to reduce this overhead at the expense of some flexibility is to use short patterns which are repeated over the raster. For example: let us have a raster with 50 points. Depending on the desired number of bits to be spent for signaling of PO presence, short patterns may be defined. For example, let us assume the use of only 4 bits to signal the actual location of 32 POs ($N_{PO}$=32) within the 50 raster points. With 4 bits up to 16 different values, corresponding to short patterns, can be indicated (in fact 15 values, because a null pattern 0000 does not apply). Thus, if we transmit the pattern 1001, the UE assumes that the POs will appear in the positions where 1's are located repeating the pattern until the required number of POs is attained. Thus, the patterns of POs in the raster would be 100110011001 . . . 1001 until 32 ones appear. In this manner, instead of transmitting a bitmap of 50 bits, only 4 bits are transmitted, but obviously there is a constrain to 15 patterns. Signaling the repeated short-patterns provides less flexibility, but may substantially reduce signaling overhead.

In other words, a bitmap may be signaled from a base station to user devices indicating with each bit for one raster time point whether or not a paging occasion is included in said raster time point. The bitmap includes one bit for each raster point in the paging cycle. Depending on the maximum number of paging occasions desired per paging cycle, the raster spacing may be selected (implicitly indicated by the number of paging occasions or signaled explicitly as mentioned above).

Alternatively, in order to reduce overhead in signaling the bitmap, an additional constraint is introduced specifying that the location of paging occasions within the raster is cyclically repeated according to a short-pattern. The short pattern specifies for N neighboring raster points the actual presence of POs. N is an integer smaller than the number of raster points, e.g., in particular smaller than or equal to the half of the raster points. The short pattern may be then signaled by means of a corresponding short (N point) bitmap which indicates with each of the N bits presence or absence of the PO in the respective corresponding raster point out of the N raster points. At the user device, the short bitmap is received and interpreted: The N bits are cyclically mapped on the raster points to determine for each raster points whether or not PO is present therein.

It is noted that the above PO presence signaling examples (raster bitmap, short bitmap) are only exemplary and non limiting for the present disclosure. Moreover, the short bitmap may have any length. The length of the short bitmap may also be signaled, i.e., configurable. Alternatively, it may be implicitly determined based on other cell parameters or fixed in the standard.

Figure 10:
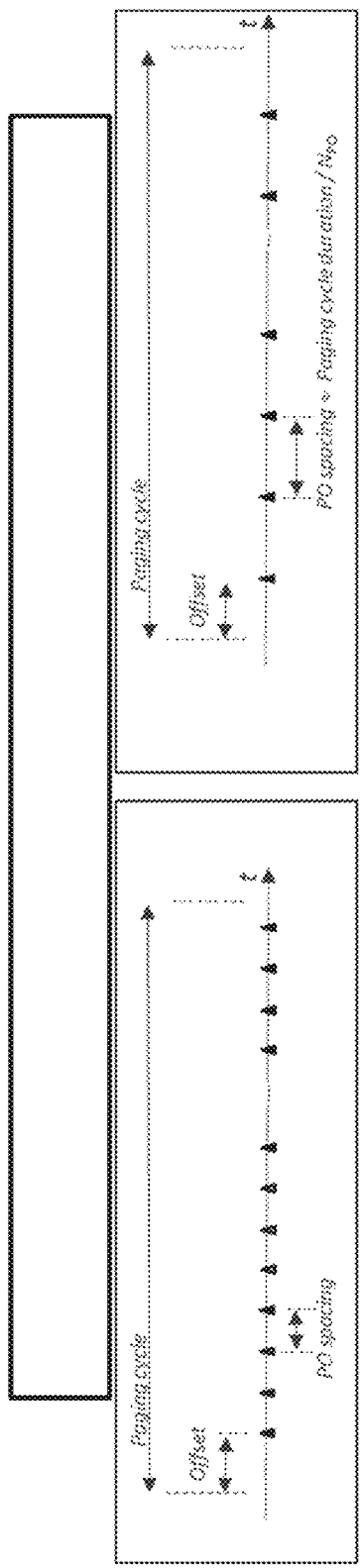
FIG. 10 is a schematic drawing illustrating predefined pattern for PO locations, namely location on a raster and uniformly distributed locations.

The beginning of the raster can be specified as an offset from the beginning of the paging cycle, as illustrated in FIG. 10. The target PO from the UE perspective can be autonomously determined by UE. In other words, a particular UE does not need to perform reception in each PO indicated as present in the raster.

By selecting the proper locations and number of POs, a gNB can flexibly avoid CORESETs collisions, adjust paging capacity, and have different inter-PO-times. Also PO length is considered. Accordingly, although the raster is regular and equidistantly spaced, POs can be flexibly configured within the paging cycle.

According to an exemplary implementation, the raster time points are defined in such positions within the paging cycle that the configurable paging occasions do not overlap with synchronization signal blocks. This is an exemplary constraint. It is noted that here, the overlapping to be avoided is in time-domain in case the bandwidth to be used by POs and synchronization signal blocks overlap (the above mentioned multiplexing pattern 1, cf. FIG. 5).

Figure 11:
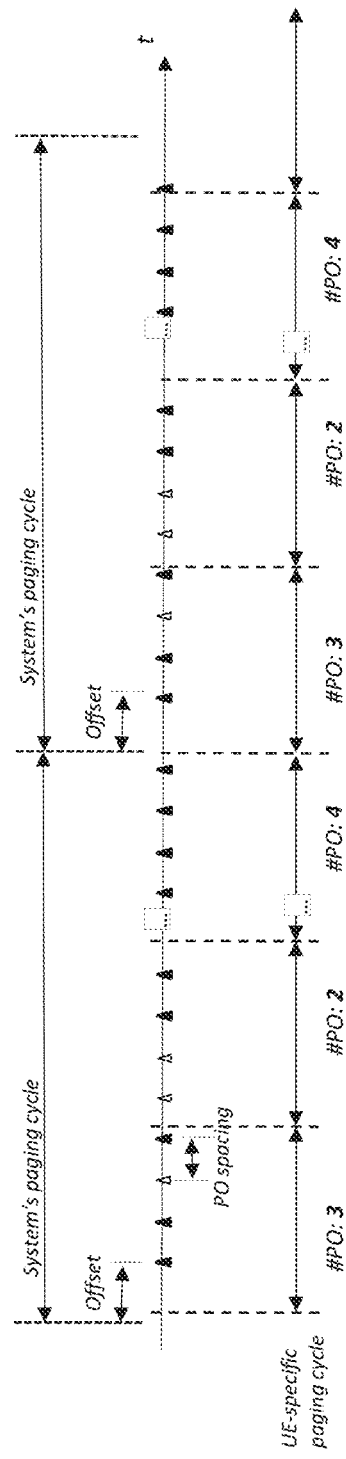
FIG. 11 is a schematic drawing illustrating location of POs on a raster within a paging cycle.

FIG. 11 shows a more detailed explanation of the raster-based PO pattern from the point of view of both the base station and the user device. In particular, FIG. 11 shows the system's paging cycle and an offset indicating start of the raster within each paging cycle. The raster is shown by the triangles, equidistantly spaced by "PO spacing." The actual presence of POs is indicated by dark triangles. The remaining triangles merely represent raster positions without actual presence of PO. On the bottom part of FIG. 11, a shorter, UE-specific paging cycles is shown. In particular, there are 6 UE-specific cycles shown with the respective numbers of POs 3, 2, 4, 3, 2, 4 (denoted as #PO). As can be seen in FIG. 11, the system paging cycle and the UE-specific paging cycle are not necessarily aligned or otherwise coordinated. In a UE-specific cycle, the UE may be obliged to read only one PO referred to as "target PO." Such target PO may be determined by the UE by using a formula (known to both base station and the UE). Such formula may involve a modulo calculation. For example, if there is the same number of POs in the UE-specific cycle, the calculation may be performed as modulo operation with the number of POs per the UE-specific cycle over a number which may be calculated based on a UE identity and possibly some further parameters. In FIG. 11, the number of POs in the UE-specific cycle differs. According to an exemplary implementation, the target PO may be calculated by applying modulo number determined as minimum number of POs in the UE-specific cycle. In the example of FIG. 11 the minimum of the POs per UE-specific cycle is 2. Other solutions are possible.

Figure 12:
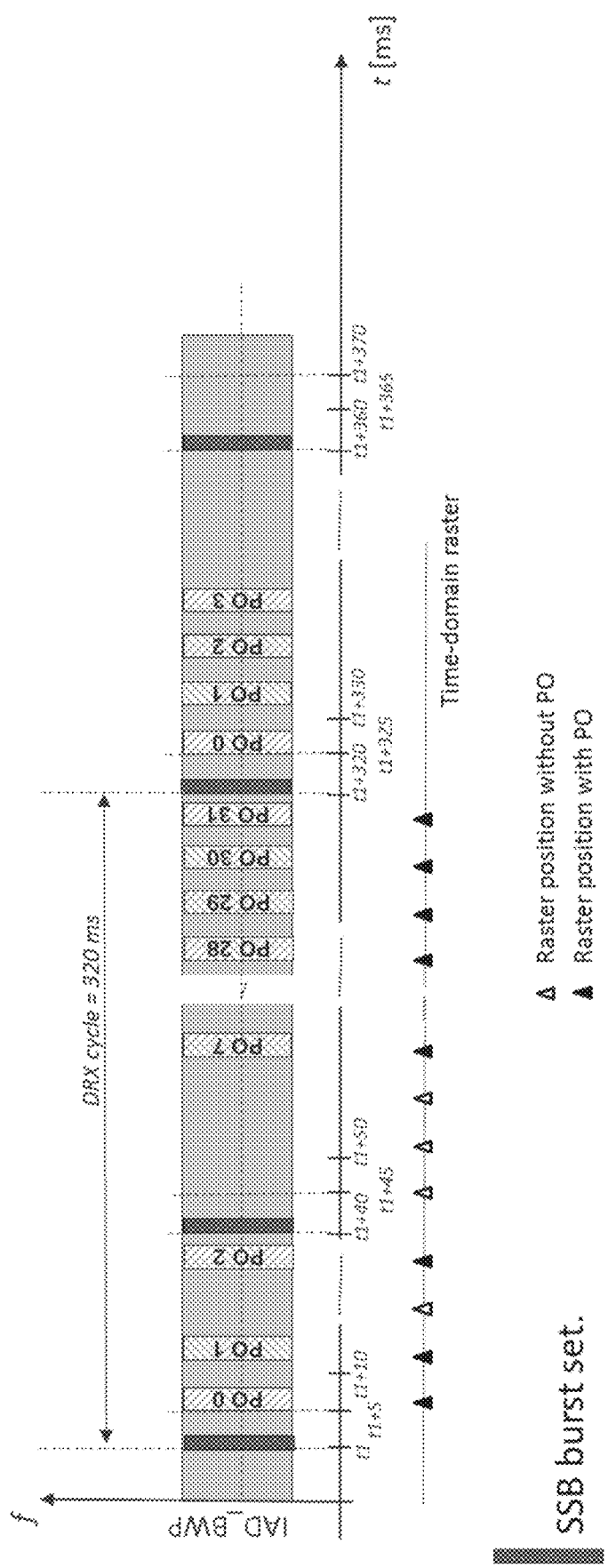
FIG. 12 is a schematic drawing illustrating location of POs on a raster within a paging cycle.

FIG. 12 illustrated another example in which the actual presence of the POs in the raster points is coordinated with the SSB burst locations. In particular, the POs are present only on raster point in which there is no overlap with the SSBs in time domain. In particular, Cell setting in this case is $N_{PO}$=32, $T_{DRX}$=320 ms, $T_{SSB}$=40 ms and multiplexing Pattern 1. In this example 32 POs 0 to 31 are positioned over the DRX cycle (paging cycle).

Uniform Distribution of POs within the Paging Cycle

According to another embodiment, the predefined time-domain pattern specifies that the paging occasions are to be received in uniformly distributed time intervals within the paging cycle; and the paging occasion configuration indicates the periodicity of the uniformly distributed time intervals. This is illustrated on the right hand side of FIG. 10. In this case, a PO is present in each of the uniformly distributed POs, resulting in a PO spacing given by a ratio between the paging cycle (system cycle) duration and the number of POs desired.

In other words, the idea of this embodiment is to provide a predefined paging occasion patent by allocating the $N_{PO}$ POs equally distributed (over the paging occasion cycle) in positions that can be calculated by the UE according to predefined rules.

For example, one rule may be to avoid collisions with SSBs in multiplexing pattern 1 by—should a collision occur—taking the next following (or next preceding) slot or skipping the PO or the like. In general, the collision avoidance rule may be to take the ith slot after or before the end of the synchronization signals. Other possibility is assume that the half-frame where SSBs are, simply is not there (remove it) and make the PO follow uniform distribution in the remaining time-line.

In order to provide UE with the PO location, the number of POs in the cycle as well as the offset within the paging cycle in which the first PO is located need to be known. The offset, as also the raster offset in the above raster embodiment, may be fixed or configurable. Typically, the offset would be smaller than the distance between neighboring POs. To have a similar LTE design, $N_{PO}$ can be selected from a predefined set, e.g., {4, 16, 32, 64} or the like. However, this is only an example non-limiting for the present disclosure.

The target PO from UE perspective can be autonomously determined by UE as also shown in the above embodiment. Accordingly, the UE can calculate which of the POs of the system cycle has to be received (checked) by the UE based on a formula or algorithm known to both base station and the UE. The base station then distributes the paging indication (DCI) for a particular UE into the POs which the UE reads.

In this embodiment, all $N_{PO}$ positions have POs, therefore this approach is more suitable for multiplexing patterns 2 or 3 in which overlapping with SSBs does not occur. However, as also indicated above, offset setting may help avoiding SSB collision and there may be some additional constraints to enable employing of this embodiment also to pattern 1.

Figure 13:
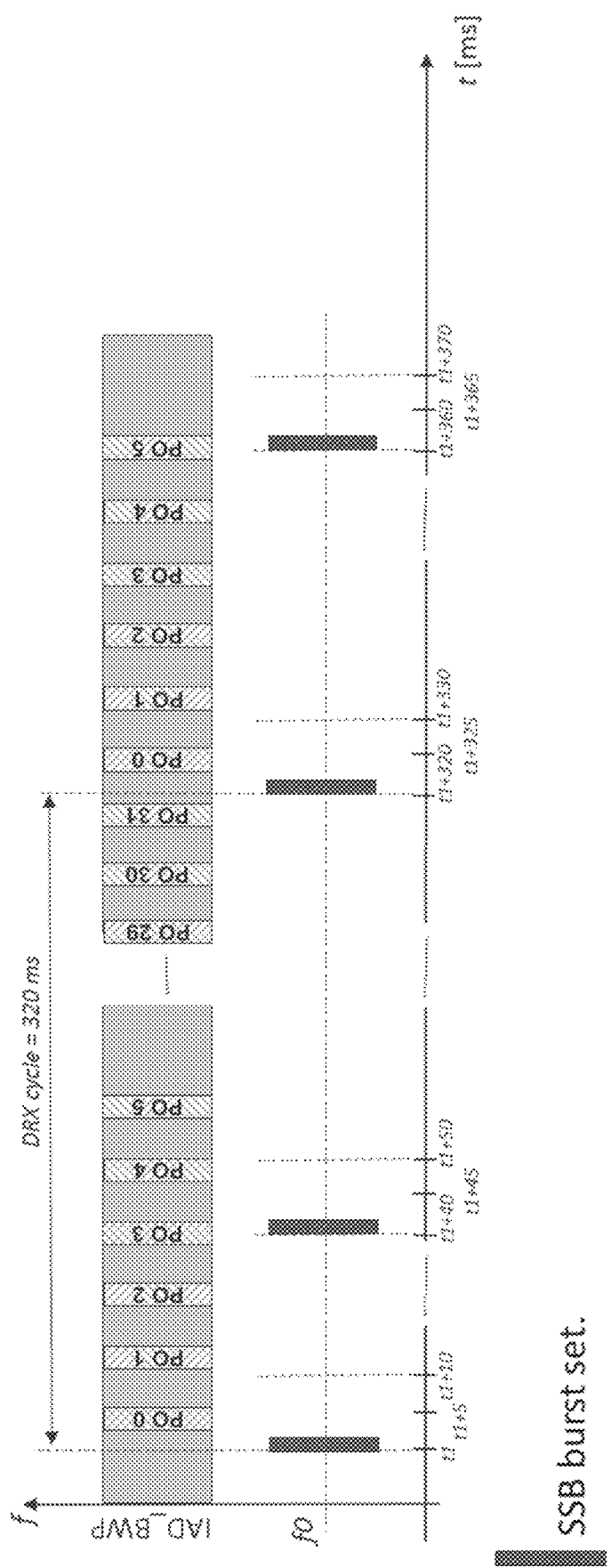
FIG. 13 is a schematic drawing illustrating uniformly distributed PO locations over a paging cycle.

FIG. 13 illustrates an example in which the POs are equally distributed over the DRX cycle. The exemplary cell settings are, $N_{PO}$=32, $T_{DRX}$=320 ms, $T_{SSB}$=40 ms, and multiplexing Pattern 2 so that SSBs are located in a frequency band different from the frequency band in which the POs are located. Thus, no collisions occur.

In one exemplary implementation, the periodicity is specified in the received paging occasion configuration as a number of paging occasions within the paging cycle. This refers to the way in which the periodicity (in this case corresponding to inter-PO-time) is determined. Paging cycle here refers (is understood) to a system (network) cycle defined by system parameters. It is the default value the a UE has to use unless something else is indicated. The term "DRX cycle" is sometimes applied since it determines the periods in which UE may switch off the reception and periods in which UE has to wake-up to monitor its paging occasion. The paging cycle by network and by UE can be the same or different as mentioned above with reference to FIG. 11.

In the example of FIG. 13, the paging occasions are transmitted in a frequency subband which has no overlap with a frequency sub-band in which synchronization signal blocks are transmitted. This is true for multiplexing patterns 2 and 3.

Further Configurations

As discussed above, in principle, both raster based PO location and uniformly distributed PO location may be used for any of the multiplexing patterns in general.

According to an example, however, the configuration of the multiplexing pattern may be associated with a particular respective predefined PO pattern (the predefined time-domain pattern for reception of paging). For example, multiplexing pattern 1 (in which the SSBs and POs are located in the same frequency band) may be associated with raster based PO location whereas multiplexing patterns (pattern 2 and 3 in the above examples) with SSBs and POs in non-overlapping frequency bands may be associated with uniform PO distribution.

Other exemplary employments of the above embodiments are possible. For example, the standard may allow only one of the raster based and uniformly distributed PO location approaches. Alternatively, it may be configurable by the base station, whether raster based on uniformly distributed PO location is to be applied. Alternatively or in addition, some cell parameters may constrain the application of the raster-based and/or uniformly distributed PO locations.

In an exemplary implementation, the processing circuitry of the user device in operation performs reception of the paging signal in the paging occasions further configured according to a paging occasion calculation specific for the user device and/or a beam-sweeping configuration set in the base station. In particular, PO calculation is UE specific, and the calculation is to determine the one PO within the DRX cycle.

The paging occasion configuration may be signaled by the base station within a broadcast channel (PBCH) and includes an offset relatively to a beginning of the paging cycle. The offset may indicate the start of the raster or the location of the first PO in case of the uniform PO distribution. In other words, the offset specifies the start of the predefined time-domain pattern for receiving paging.

Figure 14:
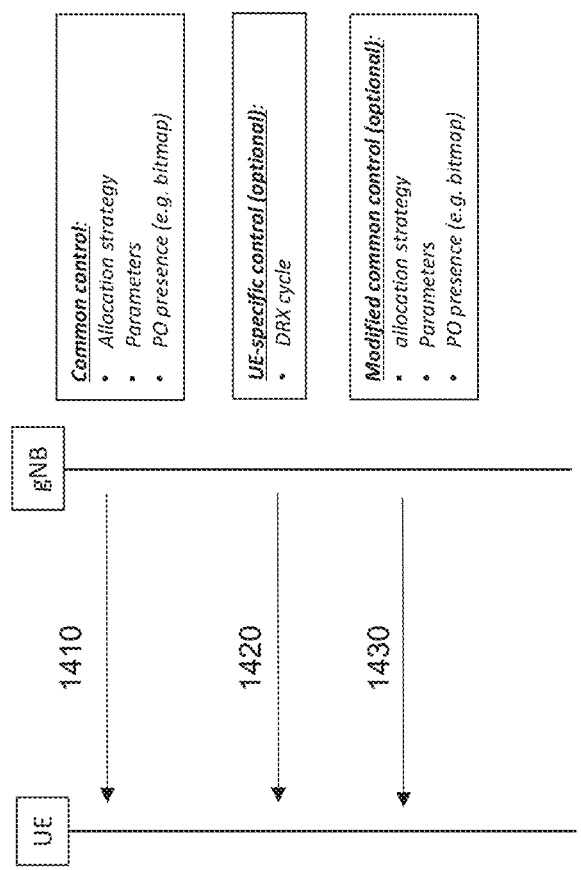
FIG. 14 is a schematic drawing illustrating configuration of PO location.

FIG. 14 shows an illustration of parameters which may determine the location of the POs to be received (checked) by the user device. At first, a signaling 1410 is provided from a base station to the user device with a configuration possibly specifying allocation strategy (the predefined time-domain pattern, e.g., raster based or uniform distribution), parameters for the allocation strategy (e.g., raster spacing, PO spacing, and/or offset), and (for the raster allocation) PO presence (e.g., bitmap, short-bitmap). This information may be provided in a default paging configuration and/or signaled in system information blocks (SIB) and is common for the cell.

Then, a UE-specific paging configuration 1420 may be signaled to the UE via RRC (Radio Resource Control protocol). It may define a UE-specific cycle and other parameters. A minimum number of POs (not necessarily target POs) in a DRX cycle is known by the UE from the system configuration specifying the system paging cycle and PO allocation. As described above with reference to FIG. 11, the minimum number of POs in the UE-specific cycle can be used as Modulo argument. Paging load balancing is up to the gNB, e.g., how to allocate DRX cycles and paging allocation scheme configuration.

Finally, the system information may be updated 1430 by the base station via cell broadcast and include one or more parameters described above with reference to signaling 1410.

As for the determination of a length of the PO, the length of PO may depend on the number of SSBs (beams to be swept). FIG. 3B illustrates a possibility in which the PO length in symbols/slots is arbitrary (e.g., $M_{PO}$) but proportional to L and L'. Evidently, $M_{PO}>L \times S_P$ always holds. $S_P$ is the number of symbols to be used for the paging CORESET according to the table of FIG. 7. In other words, the length of the PO can be determined by both the user device and the base station to be larger than (or equal) to a product of maximum number of beams (L) and number of time-domain symbols configured for paging resources. It is noted that from the PO allocation point of view, the PO length is only relevant to the gNB. A UE can also know the length, but from the UE perspective what matters is to know the starting point of the PO, and then the offset of the relevant CORESET within the PO; unless the UE has no clue about the location of the relevant CORESET, and in such a case, the length of the PO could also be relevant to the UE as it has to monitor the entire PO.

The location of PO should be flexibly configured to take into account the multiple options available in NR. Using the above described allocation strategies provides a unified framework to flexibly indicate the location of the POs in a compatible manner with the possible configurations available in NR, e.g., the multiplexing CORESET-SSB multiplexing patterns. Moreover, required signaling is low and no UE-specific signaling is required (unless UE-specific DRX cycle is configured). In FIG. 3B, the paging CORESET individual offsets within the respective slots may be indicated using RMSI.

As described above, the embodiments concern determination of location of the POs. This is performed at both sides, the user device as well as the base station. While the configuration of the POs within the paging cycle is the same and applicable to both sides, the base station may also be configured to configure the PO allocation (for example by setting the parameters for determining the PO locations) while the user device may be configured to receive the configuration and determine the relevant PO locations. Based on the PO locations within the paging cycle, the user device may then determine the target PO(s) which the user device then actually monitors.

Accordingly, the PO allocations and signaling may be implemented also by the base station so that they are not repeated here.

Moreover, corresponding to the steps performed by the processing circuitries of the user device and the base station referred to above with reference to FIG. 9, methods are provided for the transmission and/or reception of paging signals.

In particular, a method is provided for transmitting and/or receiving data to/from a base station in a communication system, the method to be performed in a user device and comprising the steps of: receiving paging occasion configuration from the base station, including at least one parameter for configuring a predefined time-domain pattern for receiving paging occasion within a paging cycle; and performing reception of paging signal in the paging occasions within the predefined time-domain pattern configured according to the received paging occasion configuration. Such method my be performed by any processing circuitry or in a single processor.

Moreover, a method is provided for transmitting and/or receiving data to/from a user device in a communication system, the method to be performed in a base station and comprising: transmitting paging occasion configuration to the user device, including at least one parameter for configuring a predefined time-domain pattern for receiving paging occasion within a paging cycle; and transmitting paging signal in one or more of the paging occasions within the predefined time-domain pattern configured according to the received paging occasion configuration.

It is noted that the method may include any steps described with reference to the processing circuitry above according to any of the embodiments and examples.

Furthermore, a non-transitory medium may be provided storing program code including code instructions which, when executed on a processor (or, in general a processing circuitry) perform all steps of the above described methods.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

In summary, according to example 1, a user device is provided for transmitting and/or receiving data to/from a base station in a communication system comprising circuitry which, in operation: receives paging occasion configuration from the base station, including at least one parameter for configuring a predefined time-domain pattern for receiving paging occasion within a paging cycle; and performs reception of paging signal in the paging occasions within the predefined time-domain pattern configured according to the received paging occasion configuration.

According to an example 2, in the example 1, the predefined time-domain pattern specifies that the paging occasions are only allowed to be present in a regular raster within the paging cycle; and the paging occasion configuration indicates in which raster positions the reception of the paging occasions is to be performed.

In the examples 1 or 2, the paging occasion configuration indicates at least one of (i) one of a predefined plurality of rasters; (ii) a bitmap indicating with each bit for one raster time point whether or not a paging occasion is included in said raster time point; (iii) a short-bitmap which is shorter than the number of raster points in the paging cycle, the short-bitmap, when cyclically repeated, indicate with each bit for one raster time point whether or not a paging occasion is included in said raster time point.

The raster time points may be defined in such positions within the paging cycle that the configurable paging occasions do not overlap with synchronization signal blocks.

In the example 1, the predefined time-domain pattern may specify that the paging occasions are to be received in uniformly distributed time intervals within the paging cycle; and the paging occasion configuration may indicate the periodicity of the uniformly distributed time intervals.

In one example, the periodicity is specified in the received paging occasion configuration as a number of paging occasions within the paging cycle.

In some embodiments, the paging occasions are transmitted in a frequency subband, which has no overlap with a frequency subband in which synchronization signal blocks are transmitted.

According to an exemplary implementation, the processing circuitry of the user device in operation performs reception of the paging signal in the paging occasions further configured according to a paging occasion calculation specific for the user device and/or a beam-sweeping configuration set in the base station.

In some embodiments, the paging occasion configuration is signaled by the base station within a broadcast channel and includes an offset relatively to a beginning of the paging cycle.

According to a general example, a base station is provided for transmitting and/or receiving data to/from a user device in a communication system comprising a processing circuitry which, in operation: transmits paging occasion configuration to the user device, including at least one parameter for configuring a predefined time-domain pattern for receiving paging occasion within a paging cycle; and transmits paging signal in one or more of the paging occasions within the predefined time-domain pattern configured according to the received paging occasion configuration.

In the general example, according to an embodiment, the predefined time-domain pattern specifies that the paging occasions are only allowed to be present in a regular raster within the paging cycle; and the paging occasion configuration indicates in which raster positions the reception of the paging occasions is to be performed.

The paging occasion configuration may indicate at least one of (i) one of a predefined plurality of rasters; (ii) a bitmap indicating with each bit for one raster time point whether or not a paging occasion is included in said raster time point; (iii) a short-bitmap which is shorter than the number of raster points in the paging cycle, the short-bitmap, when cyclically repeated, indicate with each bit for one raster time point whether or not a paging occasion is included in said raster time point.

The raster time points may be defined in such positions within the paging cycle that the configurable paging occasions do not overlap with synchronization signal blocks.

In the general example, according to an embodiment, the predefined time-domain pattern specifies that the paging occasions are to be transmitted in uniformly distributed time intervals within the paging cycle; and the paging occasion configuration indicates the periodicity of the uniformly distributed time intervals.

The periodicity may be specified in the transmitted paging occasion configuration as a number of paging occasions within the paging cycle.

Moreover, the paging occasions can be transmitted in a frequency subband which has no overlap with a frequency subband in which synchronization signal blocks are transmitted.

In one example, the processing circuitry of the base station in operation transmits the paging signal in the paging occasions further configured according to a paging occasion calculation specific for the user device and/or a beam-sweeping configuration set in the base station.

The paging occasion configuration can be signaled by the base station within a broadcast channel and includes an offset relatively to a beginning of the paging cycle.

The corresponding methods are also provided. In one example, a method is provided for transmitting and/or receiving data to/from a base station in a communication system, the method to be performed in a user device and comprising the steps of: receiving paging occasion configuration from the base station, including at least one parameter for configuring a predefined time-domain pattern for receiving paging occasion within a paging cycle; and performing reception of paging signal in the paging occasions within the predefined time-domain pattern configured according to the received paging occasion configuration.

Moreover, a method is provided for transmitting and/or receiving data to/from a user device in a communication system, the method to be performed in a base station and comprising: transmitting paging occasion configuration to the user device, including at least one parameter for configuring a predefined time-domain pattern for receiving paging occasion within a paging cycle; and transmitting paging signal in one or more of the paging occasions within the predefined time-domain pattern configured according to the received paging occasion configuration.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A user equipment comprising:
a transceiver, which, in operation, transmits or receives data to/from a base station in a communication system; and
circuitry, which, in operation:
 receives, via the transceiver, paging occasion configuration from the base station;
 configures, based on the paging occasion configuration, a time-domain pattern according to both of:
  (i) one of a plurality of raster time points; and
  (ii) a bitmap indicating, with each bit for one of the raster time points, whether or not a paging occasion is included in the raster time point; and
 receives, via the transceiver, paging signal from the base station in paging occasions within a paging cycle according to the configured time-domain pattern.

2. The user equipment according to claim 1, wherein:
the time-domain pattern specifies that the paging occasions are allowed to be present in a regular raster within the paging cycle; and
the paging occasion configuration indicates in which raster time points the reception of the paging occasions is to be performed.

3. The user equipment according to claim 1, wherein the paging occasion configuration indicates (iii) a short-bitmap, which is shorter than a number of raster time points in the paging cycle, the short-bitmap, when cyclically repeated, indicating, with each bit for one raster time point, whether or not a paging occasion is included in the raster time point.

4. The user equipment according to claim 1, wherein the raster time points are defined in such positions within the paging cycle that the configurable paging occasions do not overlap with synchronization signal blocks.

5. The user equipment according to claim 1, wherein:
the time-domain pattern specifies that the paging occasions are to be received in uniformly distributed time intervals within the paging cycle; and
the paging occasion configuration indicates the periodicity of the uniformly distributed time intervals.

6. The user equipment according to claim 5, wherein the periodicity is specified in the received paging occasion configuration as a number of paging occasions within the paging cycle.

7. The user equipment according to claim 5, wherein the paging occasions are transmitted in a frequency subband which has no overlap with a frequency subband in which synchronization signal blocks are transmitted.

8. The user equipment according to claim 1, wherein the paging occasions are configured according to a paging occasion calculation specific for the user equipment and/or a beam-sweeping configuration set in the base station.

9. The user equipment according to claim 1, wherein the paging occasion configuration is signaled by the base station within a broadcast channel and includes an offset relatively to a beginning of the paging cycle.

10. A method for transmitting and/or receiving data to/from a base station in a communication system, the method to be performed in a user equipment and comprising the steps of:
receiving paging occasion configuration from the base station;
configuring, based on the paging occasion configuration, a time-domain pattern according to both of:
(i) one of a plurality of raster time points; and
(ii) a bitmap indicating, with each bit for one of the raster time points, whether or not a paging occasion is included in the raster time point; and
receiving paging signal from the base station in paging occasions within a paging cycle according to the configured time-domain pattern.

* * * * *